United States Patent [19]

Shakkottai et al.

[11] Patent Number: 5,062,295
[45] Date of Patent: Nov. 5, 1991

[54] DUAL TUBE SONIC LEVEL GAGE

[75] Inventors: Parthasarathy Shakkottai, Duarte; Eug Y. Kwack, Walnut, both of Calif.

[73] Assignee: Sparktech, Duarte, Calif.

[21] Appl. No.: 633,130

[22] Filed: Dec. 24, 1990

[51] Int. Cl.$^5$ .................. G01F 23/28; G01H 5/00
[52] U.S. Cl. .................. 73/290 V; 340/621; 367/908
[58] Field of Search .............. 73/290 V; 364/509; 367/908

[56] References Cited

U.S. PATENT DOCUMENTS

| | | | |
|---|---|---|---|
| 4,679,430 | 7/1987 | Scott-Kesten et al. | 340/621 |
| 4,762,425 | 8/1988 | Shakkottai . | |
| 4,805,453 | 2/1989 | Haynes . | |
| 4,876,889 | 10/1989 | Shakkottai . | |
| 4,928,525 | 5/1990 | Aderholt et al. | 364/509 X |
| 4,934,186 | 6/1990 | McCoy | 73/290 V |

FOREIGN PATENT DOCUMENTS 2177510 1/1987 United Kingdom .............. 73/290 V

OTHER PUBLICATIONS

Lynnworth & Patch, New Sensors For Ultrasound: Measuring Temperature Profiles, Materials Research Standards, vol. 10, No. 8, p. 10, Aug. 1970.

Primary Examiner—Daniel M. Yasich

[57] ABSTRACT

An accurate measurement of liquid levels in a tank are made using a dual tube sonic level gage. This uses plane waves of sound, in air, propagated in two vertical tubular wave guides to locate the levels of liquid contained in each tube. One tube has slots at the bottom and allows both the light (upper) and the heavy (lower) liquids to be present inside the tube at the same level as outside (i.e. in the tank). The other tube allows only the lower liquid to enter it. In the application for a measurement of gasoline and water levels in a tank, levels outside the tube (i.e. in the tank) are calculated using the equations of hydrostatics. Corrections due to temperature need not be made in order to obtain levels accurate to 1 percent.

11 Claims, 6 Drawing Sheets

DUAL TUBE SONIC LEVEL GAGE

BACKGROUND OF THE INVENTION

1. Field of the Invention

The present invention is directed towards a system for measuring the quantity of liquid fuels contained in a tank, more particularly of the levels of gasoline and water (at the bottom) in fuel tanks, by using sonic pulses in two tubular sensors. Sound pulses travel in air with small amounts of water vapor or gasoline vapor as the case may be and measure the location of the water level or gasoline level to high accuracy by a time-of-flight method. The transducers used do not contact either gasoline or water.

2. Description of the Prior Art

The oldest method of finding a liquid level is by the use of a dipstick graduated with markings. The method is cumbersome and does not provide a continuous readout.

Ultrasonic ranging systems can be used to detect liquid levels. The system 'Tank Gauging Systems and Methods' by Haynes, U.S. Pat. No. 4,805,453, is a good example of a device that provides remote readout continuously. In this system several reflectors spaced at suitable intervals are used as markers. By a time-of-flight method, speeds of sound are measured in gasoline and water at various regions and then converted to an average speed of sound in gasoline. The surface level is determined from the measured time-of-flight and the average speed of sound. A thermometer is used for calibration purposes near the ultrasonic transducer immersed in gasoline, near the bottom of the tank. A large number of reflectors are used in this method because at least one reflector must be present between the surface of gasoline and the transducer used for calibration.

OBJECTS AND SUMMARY OF THE INVENTION

It is a primary object of the present invention to provide a measurement of levels of gasoline and water by a simple system that uses sonic pulses in air confined by tubular sensors without measuring signals in gasoline and without the use of a calibrating thermometer.

One sensor tube maintains the same levels of water and gasoline inside the tube as outside because it has a few holes (or a narrow slit) near the bottom at the boundary between water and gasoline. The addition of the holes (or the slit) along the length of the tube negligibly affects the transmission of sound waves in air contained in the upper portion of the tube. Sound, which travels down from a transmitter-detector at the top of the tube, is reflected from the gasoline surface and is sensed when it travels back to the transmitter-detector. A subsidiary reflection from a fixed reflector in the tube provides a reference. The ratio of the times of reflections provides an accurate measurement of the gasoline level, independent of temperature and the type of gasoline.

A second neighboring tube contains holes only at the very bottom. Alternatively, it could be open at the bottom. This allows only water to rise in the tube by the hydrostatic pressure of gasoline and water in the tank. As before, by the method of ranging by sonic pulses, the level of water in the tube is measured accurately and directly related to the level of water outside the tube.

DESCRIPTION OF THE PREFERRED EMBODIMENT

The system for measuring sound speed using tubular waveguides is described in 'Acoustic Temperature Profile Measuring System' by Shakkottai et al., U.S. Pat. No. 4,762,425 dated Aug. 9, 1988, and in 'Acoustic Humidity Sensor' by Shakkottai et al., U.S. Pat. No. 4,876,889 dated Oct. 31, 1989. The same system measures the length of a pipe in terms of a reference length when the temperature is uniform.

In the situation considered here, air, gasoline, and water in the tank are at the same temperature at all times. Particularly in buried or underground tanks, temperature fluctuations are negligible. The tank is well insulated and the initial temperature of the gasoline when it is filled from a truck will become uniform by convective mixing and then stay constant for a long period of time. As gasoline is drawn from the tank, which is very often, such mixing is further promoted. The whole tank is buried but the standpipe, while covered, is exposed to air in a cylindrical pit covered with a manhole-type cover. If the outside temperature rises, the air in the pit will stratify with hot air at the top and cooler air at the bottom. This is beneficial since stratified air is a good insulator.

TEMPERATURE VARIATIONS

An estimate of the fluctuation in the temperature of the air confined in the tank above the gasoline can be easily made. In the confined volume, natural convection starts when the Rayleigh Number exceeds 1700. The Rayleigh Number is defined by $$Ra = g \frac{\Delta T}{T} \frac{l^3}{\nu \kappa} \qquad (1)$$

where:

g = acceleration due to gravity, 980 cm s$^{-2}$;
$\Delta T$ = temperature difference between top and bottom, K;
T = mean temperature, K;
l = typical length scale of the tank, 100 cm;
$\nu$ = kinematic viscosity of air, 0.15 cm$^2$s$^{-1}$; and
k = thermal diffusivity of air, 0.2 cm$^2$s$^{-1}$.

Using these typical values, natural convection starts when $$\frac{\Delta T}{T} = \frac{1700}{980} \times \frac{0.15 \times 0.2}{100^3} = 5.2 \times 10^{-8}$$

which means that at a mean temperature of 300K, $\Delta T$ is $1.6 \times 10^{-5}$. Therefore, convection will always occur in the air space above the gasoline. If the temperature difference between the top wall and the gasoline surface is larger, air motion will occur to eliminate that difference in the main body of air, except for thin layers near the walls of the tank. In fact, if $\Delta T$ is 1K, $$Ra = \frac{980}{300} \times \frac{100^3}{0.15 \times 0.2} = 1.1 \times 10^8$$

for which the convective motion will be turbulent. In such cases, the temperature fluctuations in the main body of air will be in the order of 0.1K.

The temperature fluctuations in the air confined within the tubular sensors are even smaller. By using tubes with high thermal conductivities (e.g. copper tubes), temperature fluctuations in the air within the tubular sensors can be made vanishingly small.

MEASUREMENT PRINCIPLE

Figure 1:
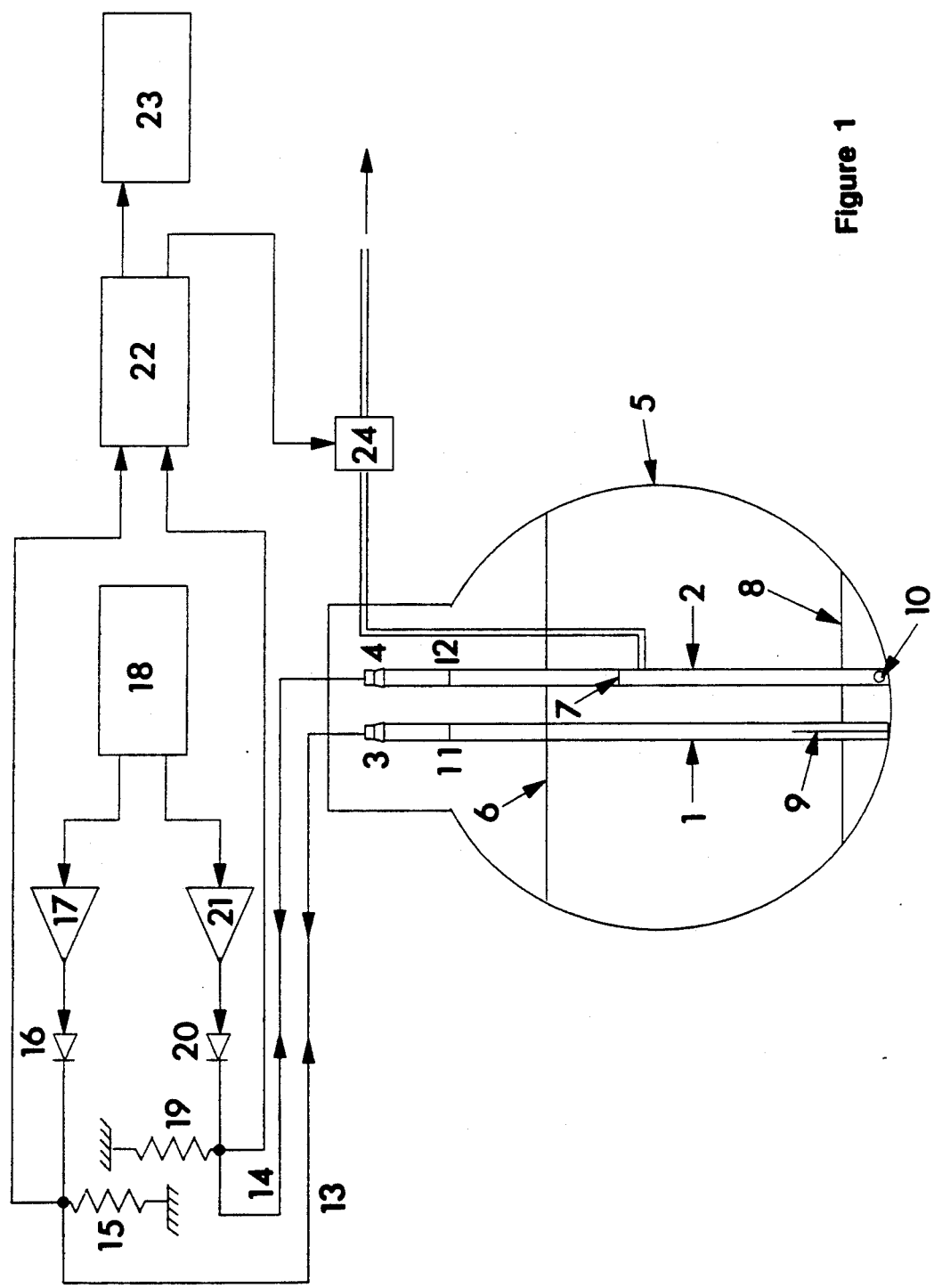
FIG. 1 is a schematic drawing which shows two tubular sonic wave guides installed in a tank with gasoline above water which is present at the bottom. Levels of gasoline in the first tube and water in the second tube are obtained by sonic ranging in air using pulses of sound. The sketch also shows how the water can be removed from the tank when it exceeds a preset level in the second tube.

Two tubular sensors, 1 and 2, are mounted vertically in Tank 5 as shown in FIG. 1. In tube 1, the levels of gasoline, 6, and of water, 8, are the same as outside and are indicated by $h_{1g}$ and $h_{1w}$, respectively. This is so because the long slit, 9, allows water and gasoline to get into tube 1. Tube 2 has holes 10 at the very bottom and allows only water to get in. The water in tube 2 being heavier, rises to a smaller height $h_{2w}$ shown as 7 in FIG. 1. The heights are measured upwards with zero indicating the bottom. From hydrostatics, $$p_g g(h_{1g}-h_{1w})+p_w g h_{1w}=p_w g h_{2w} \qquad (2)$$

where, g is the acceleration due to gravity, and $p_g$ and $p_w$ are the densities of gasoline and water, respecively. Therefore, $$h_{1w}=[h_{2w}-(p_g/p_w)h_{1g}]/(1-p_g/p_w) \qquad (3)$$

can be calculated if $h_{2w}$ and $h_{1g}$ are determined (by the sonic pulse mathod) as long as $p_g/p_w$ is also known. When the tank is nearly empty of gasoline, $h_{2w}$ becomes nearly equal to $h_{1w}$.

ERROR ANALYSIS

The specific gravities of different grades of gasoline vary within a range of values, typically from 0.725 to 0.744, in one laboratory test. Assuming that there are no errors in the measurements of $h_{1g}$ and $h_{2w}$, we can make estimates of error in the value of $h_{1w}$ resulting from uncertainties in the value of $p_g/p_w$. Rewriting equation (2) as $$h_{1w}+(p_g/p_w)(h_{1g}-h_{1w})=h_{2w} \qquad (4)$$

and taking variations, $$\delta h_{1w}+(p_g/p_w)(-\delta h_{1w})+\delta(p_g/p_w)(h_{1g}-h_{1w})=0 \qquad (5)$$

or $$\delta h_{1w} = -\delta(p_g/p_w)(h_{1g}-h_{1w})/(1-p_g/p_w) \qquad (6)$$

Using values of specific gravities in the range given above, $$\delta h_{1w} = -\frac{0.744 - 0.725}{1 - 0.737}(h_{1g} - h_{1w}) = -0.0722(h_{1g} - h_{1w}) \qquad (7)$$

Equation (7) shows that the peak-to-peak error in $h_{1w}$ is approximately equal to 7 percent of the gasoline layer thickness. When the gasoline layer is of small extent, the thickness measurements are very accurate and are independent of $p_g/p_w$. The implication of this is that if a measurement is made when the water and gasoline layers are each 15 cm deep, the measure value of the water layer will be (150±5) mm which is entirely adequate. Since the measurements continue to be taken even when the gasoline layer is thinner than 15 cm, the error can be further reduced, e.g. (150±2.5) mm when the gasoline layer is 7.5 cm thick. At that point or thereabouts, the tank would have to be refilled. It is clear from the preceeding that there is no practical need for a more accurate measurement of $p_g/p_w$ or to correct for its temperature dependence, even though the sonic pulse method does determine temperature as a byproduct which could have conceivably been used had there been a need to do so. Incidentally, both gasoline and water expand on heating, with coefficients of expansions equal to $9 \times 10^{-4}$ per degree C. and $2 \times 10^{-4}$ per degree C., respectively. Therefore, the density ratio has a expansion coefficient of $7 \times 10^{-4}$ per degree C. A change of 10 C. therefore, changes the value of $p_g/p_w$ by 0.7 percent which is smaller than its variation due to changes in gasoline type.

THE SONIC PULSE METHOD

As shown in FIG. 1, pulse generator 18 produces narrow pulses, repeated at a low rate, say once every second, which are then amplified by amplifier 17 and applied through a blocking diode 16 and coaxial cable 13 to the transmitter-receiver 3. Damping is provided by resistor 15. Pulses are reflected by a discontinuity in the form of a stub, ring, or diametral rod 11 and from the surface 6 of gasoline and are received by receiver 3. This signal is prevented from being shorted by amplifier 17 by blocking diode 16 and is read by a microcomputer 22 which measures the time intervals from the transmission to reflection by 11 and by gasoline surface 6. The diode also prevents oscillations from occuring in the output amplifier 17 in the reverberent environment of the tubular sensor. The electronic components shown in FIG. 1 are readily available commercial items. However, they may be replaced by a combined special purpose package designed for this application.

Similarly, pulse generator 18 applies pulses to the other transmitter-receiver 4 through amplifier 21, diode 20, cable 14 and receives signals from stub 12 and water level 7. Resistances 15 and 19 are the input resistances (typically 100 ohms) for providing the received signals a current path to ground. This signal enters microcomputer 22. The output device 23 lists levels of water and gasoline in the tank and their volumes and generates suitable warnings for action if there is too much water or too little gasoline etc. Since water rises high when the tank is full, it will be possible to pump water out from tube 2 automatically, governed by a program action in microcomputer 22, when the water level exceeds a preset level. Thus, the water level and the amount of water in the tank can be held at constant, specified levels. In FIG. 1, microcomputer 22 controls pump 24 which pumps the water out from tube 2 to a drain when level 7 exceeds the preset value (slightly below 7 as in FIG. 1).

The microcomputer can also keep a log of gasoline volume in the tank and the amount of gasoline dispensed at the pumps and warn the operator if a discrepancy develops, such as due to theft or a major leak.

SONIC SIGNALS

Figure 2:
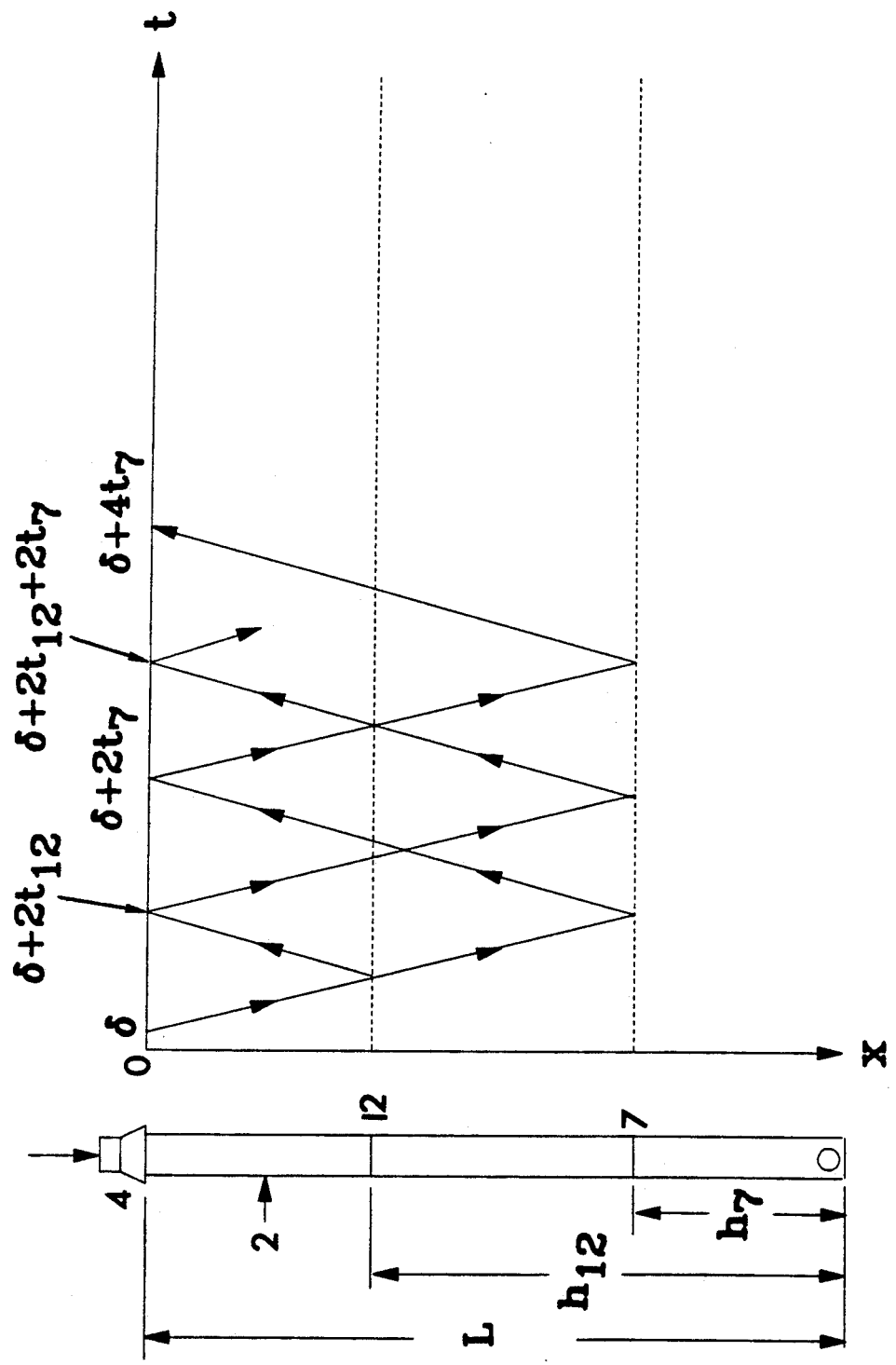
FIG. 2 is a schematic drawing showing the x-t diagram of pulses transmitted from O and received at O after multiple reflection from a stub or ring, 12, and the liquid level, 7 in tube 2.

In FIG. 2, tube 2 is shown with transmitter 4 and the reflecting boundaries 12 and 7. An x-t diagram shows the trajectories of the pulses. Pulses from stub 12 arrive at the receiver at times equal to $\delta + 2t_{12}$, $\delta + 4t_{12}$, ..., $\delta + 2t_{12} + 2t_7$, ..., etc., the first one being the strongest. Similarly, from 7, signals arrive at the receiver at time equal to $\delta + 2t_7$, $\delta + 4t_7$, ... Other weaker signals reflected by 12 also arrive at the transmitter. Here $\delta$ is the small, fixed delay in the transmitter from the start of the trigger pulse and it is calculated by noting the times of arrival of the stronger reflections $\delta + 2t_7$ and $\delta + 4t_7$ $4t_7$ whose difference gives $2t_7$. Subtracting $2t_7$ from $\delta + 2t_7$ yields $\delta$. By similar triangles, $$\frac{L - h_{12}}{L - h_7} = \frac{2t_{12}}{2t_7} \quad (8)$$

from which $h_7 = h_{2w}$ is determined.

For tube 1, a similar equation is obtained:

$$\frac{L - h_{11}}{L - h_6} = \frac{L - h_{1s}}{L - h_{1g}} = \frac{t_{11}}{t_6} \quad (9)$$

Use of equations (8) and (9) eliminates the requirement of knowledge of the speed of sound of the media in the tubes 1 and 2 and their temperatures. Actually, the speed of sound can also be determined by using the following equation, $$\frac{2(L - h_{2s})}{(t_{12} - \delta)} = c_2 \quad (10)$$

where $c_2$ is the speed of sound of air in tube 2, from which the temperature of air in tube 2 can be calculated by $$\frac{T}{273} = \left(\frac{c_2}{331.3}\right)^2 \quad (11)$$

where T is in Kelvins and $c_2$ is in ms$^{-1}$.

ACCURACY OF TIME MEASUREMENT

The time intervals $t_7$, $t_{12}$, $t_6$, and $t_{11}$ can be measured to four significant figures. For example, in ambient air, a round trip travel of 1 meter takes 2.915 ms. Time intervals $t_7$ and $t_{12}$ may have values like 2.4607 ms and 1.0935 ms.

Figure 3:
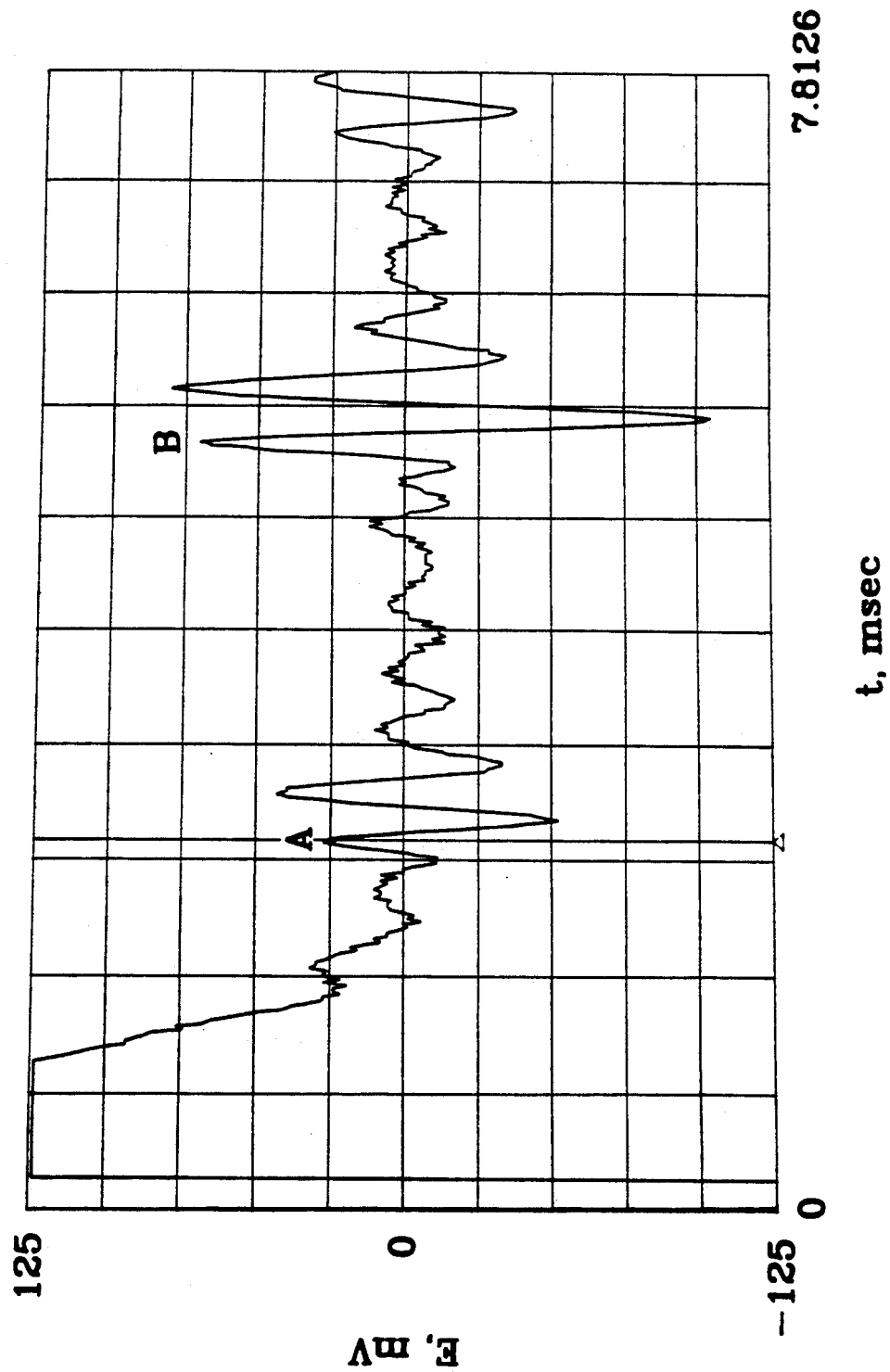
FIG. 3 is an actual trace of the signal received from a ring located 37.5 cm from the transmitter-receiver (at the top) with the end being at 83.98 cm measured from the top.

A sample signal from tube 2 with reflections from ring 12 and level 7 is shown in FIG. 3 from which, $\delta + 2t_{12} = 2.4610$ ms, $\delta + 2t_7 = 5.1954$ ms, $\delta + 2t_{12} + 2t_7 = 7.3824$ ms, $L - h_{12} = 37.50$ cm, $L - h_7 = 83.98$ cm, showing that $$\frac{L - h_{12}}{L - h_7} = 0.4465,$$

and $$\frac{t_{12}}{t_7} = 0.4443,$$

are equal to 1 part in 200.

Therefore, the ratio of the lengths on the left hand sides of equations (8) and (9) are also accurate to 1 part in 200. Measurement of times is essentially equivalent to reading a length of one millimeter using a tape measure.

SHARPNESS OF PULSES

A commercially available wide dispersion piezo tweeter can be used as the transmitter-receiver since it is sensitive enough as a receiver. A typical signal is shown in FIG. 3. The two wave groups are from a 0.25 inch ring located 46.48 cm in front of a closed end wall. The length of the tube was 83.98 cm. In the Figure, the full scale from zero to peak is 125 mV. There is an initial period where the large electrical pulse applied to the transmitter is decaying, making the first 1.5 ms useless for observation. This dead-zone corresponds to 26 cm in air. In the application of the sonic method to gasoline level measurement, there is no difficulty in locating the reference stub or ring beyond 26 cm from the transmiter. Location of the first peaks in the pulses marked A and B in FIG. 3 can be done either by analog electronics using delay gates and counters or by a program on the signal data, captured and processed periodically. Conversion of time ratios to distances and volumes is straightforward.

TWO-MICROPHONE METHOD

Superior signals are obtained when microphones are used to mark a reference distance instead of stubs or rings. Also, the dead-zone is eliminated. The signal levels are larger approximately by a factor of 8. The initial baseline noise is extremely small and makes signal processing somewhat easier. In this method, there are no discontinuities in the tube and the sound waves from the two microphones and the end reflection are all of the same level. This also simplifies data processing. In this method, the time delay, $\delta$ need not be measured.

Figure 4:
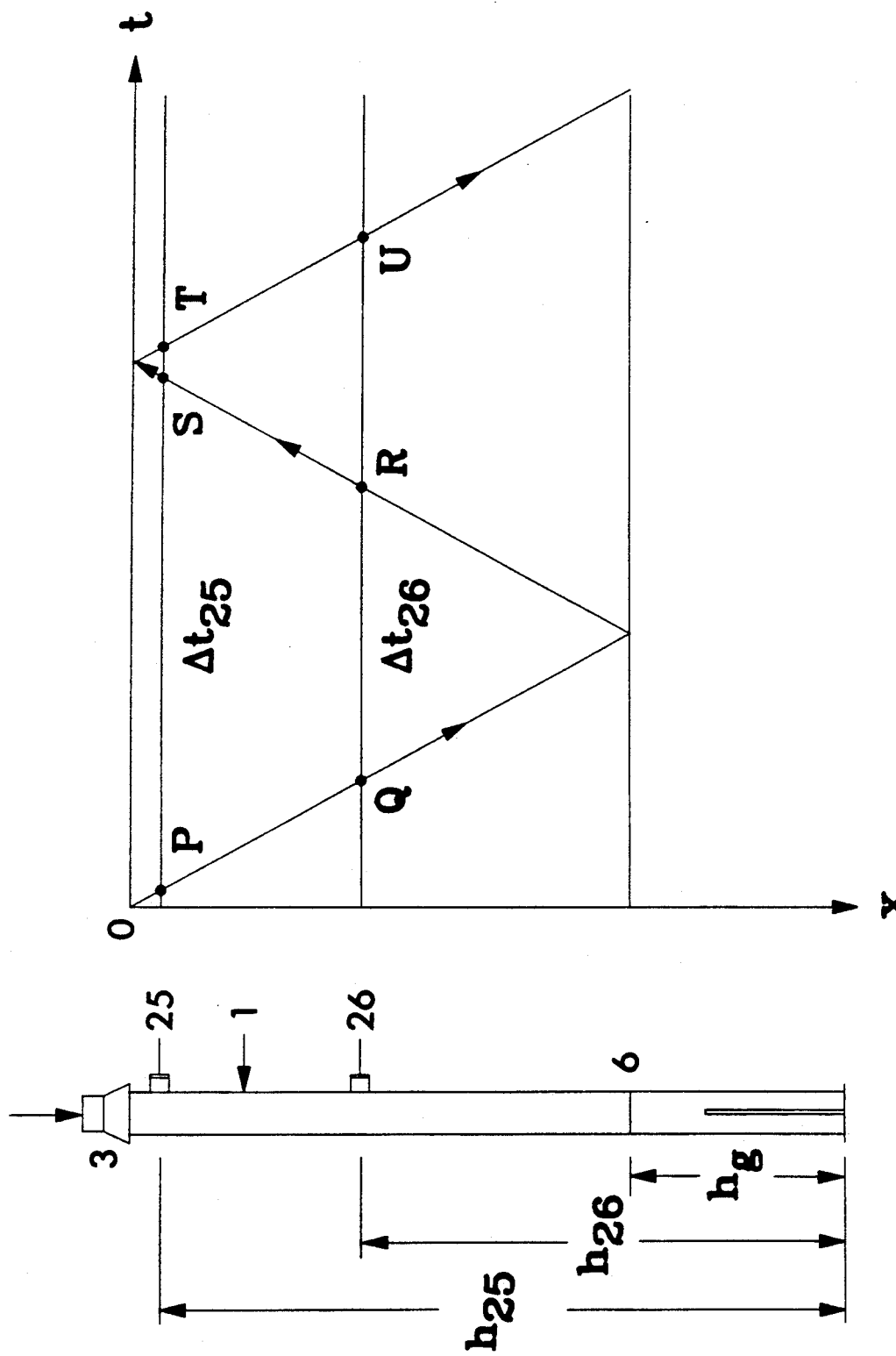
FIG. 4 is a schematic drawing of an alternate measurement system with two microphones (instead of a single reflector for calibration). Here signals received at P and S from the first microphone and by Q and R from the second microphone are used to determine level 6 by similar triangles.

FIG. 4 shows microphones 25 and 26 installed in tube 1 where the gasoline level is at 6 as before. Letting subscripts 26 and 25 refer to heights $h_{26}$ and $h_{25}$, and referring to the x-t diagram, $h_g$ can be calculated as follows. In the x-t diagram, a pulse travels from 3 and is detected by the microphones at the points P, Q, R, S, etc. as indicated. Also shown are the time durations, $\Delta t_{25}$ and $\Delta t_{26}$, between the outgoing and reflected pulses. By similar triangles $$\frac{h_{26} - h_g}{h_{25} - h_{26}} = \frac{\Delta t_{26}}{\Delta t_{25} - \Delta t_{26}} \tag{12}$$

from which $$h_g = h_{26} - \frac{h_{25} - h_{26}}{\Delta t_{25} - \Delta t_{26}} \Delta t_{26} \tag{13}$$

Figure 5:
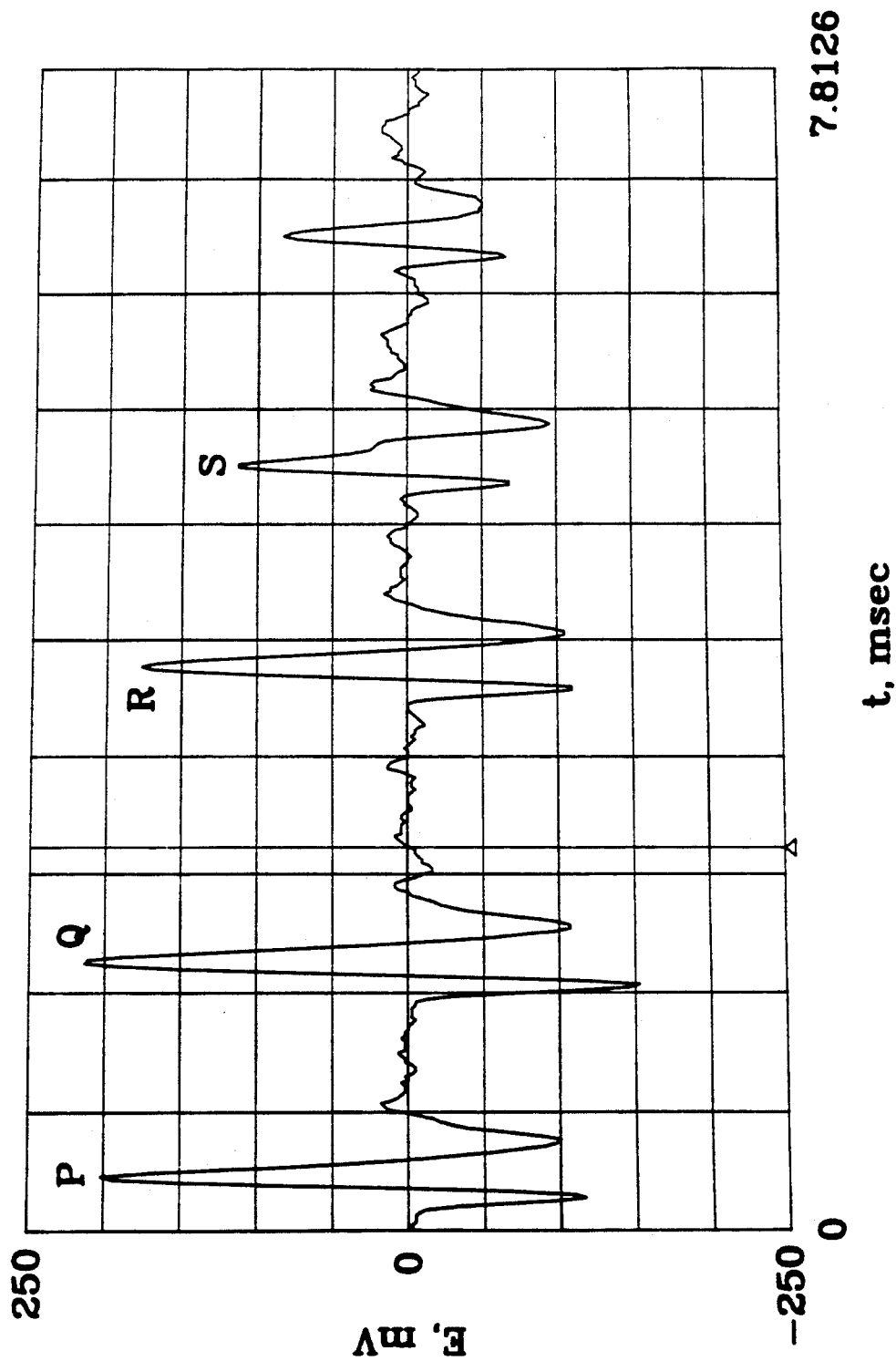
FIG. 5 is an actual trace showing the sum of the signals from two microphones located at 81.92 cm and 34.29 cm from the end reflector. The signal-to-noise ratio is higher by this method.

FIG. 5 shows a typical example of the sum of the two microphone signals where the waves are again marked P, Q, R, and S as in FIG. 4. In this case, $\Delta t_{26} = 1.9812$ ms $\Delta t_{25} = 4.7387$ ms $h_{26} - h_g = 34.29$ cm $h_{25} - h_{26} = 47.63$ cm from which $$\frac{h_{25} - h_g}{h_{25} - h_{26}} = 0.7199$$

and $$\frac{\Delta t_{26}}{\Delta t_{25} - \Delta t_{26}} = 0.7185$$

showing that the method is accurate to one part in 500.

Figure 6:
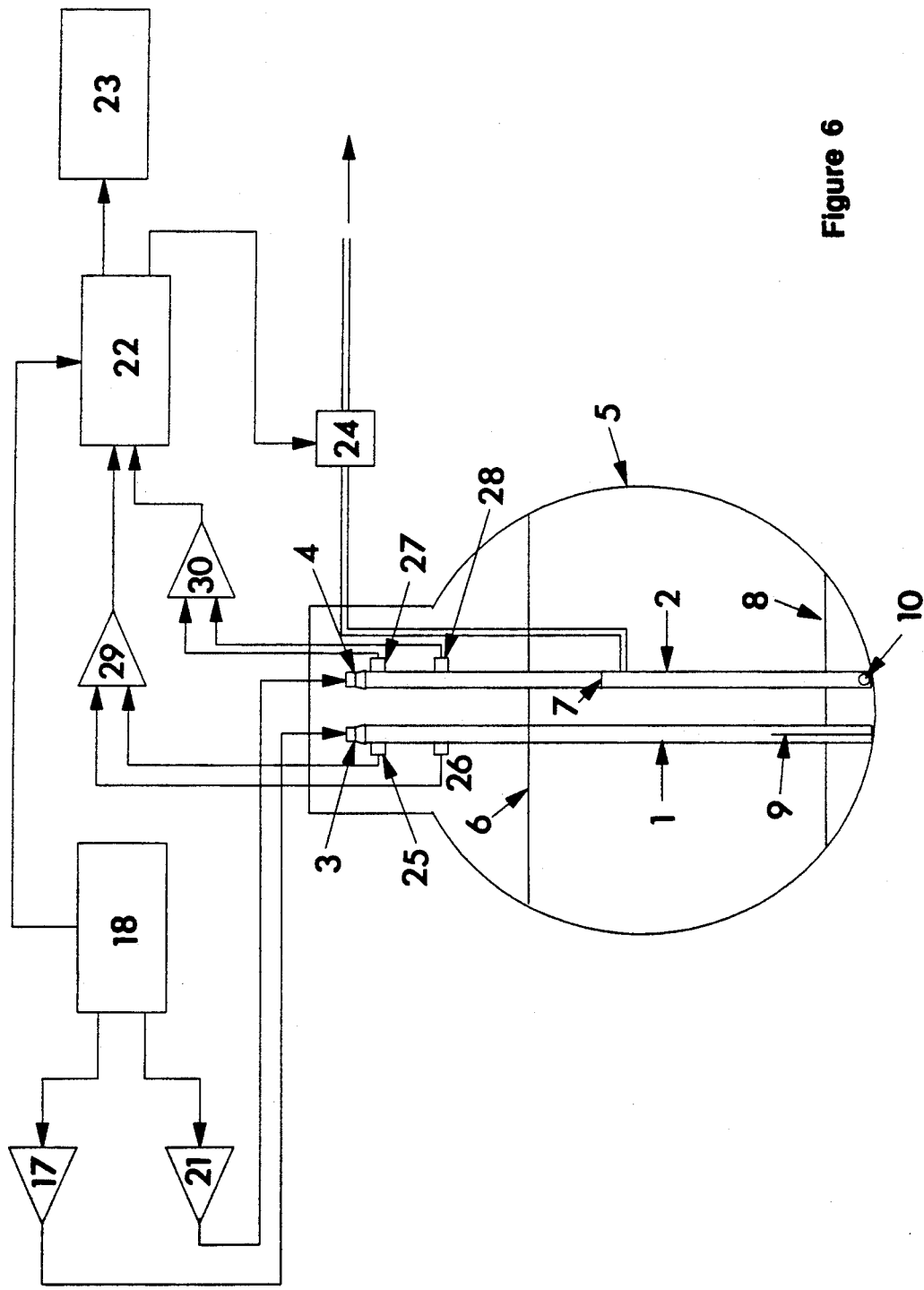
FIG. 6 shows the alternate implementation of the sonic level gage using two microphones spaced a fixed distance apart in each tube being used as the reference length.

FIG. 6 shows the system with microphones 25 and 26 in tube 1 and microphones 27 and 28 in tube 2. Pulse generator 18 drives transducers 3 and 4 as before but the voltage at their terminals are not used. Signals from 25 and 26 are added by a buffer amplifier 29 and signals from 27 and 28 are added by amplifier 30. The added signals from the buffer amplifiers are input into microcomputer 22 as before. Calculations of $h_{1g}$ and $h_{1w}$ are made using the formulas described earlier.

The embodiments of the invention in which an exclusive property or previlege is claimed or defined as follows:

1. A system for measuring the levels of two immiscible liquids such as water and gasoline contained in a tank, comprising two vertical tubular sonic wave guides, resting at the bottom of said tank; one of said wave guides allowing water and gasoline to enter through a long vertical slit thus allowing said gasoline to have the same free surface level inside said guide as outside in said tank; the extent of said slit being from the bottom to the maximum expected level of said lower liquid; the other said waveguide allowing only the heavier liquid to rise by virtue of its being open only at the very bottom; each said guide containing a reflecting stub or ring to produce a reference length from the top to location of said stub or ring; a transmitting and receiving means in each said waveguide for generating sound pulses and detecting said sound pulses multiply-reflected from said stub or ring and from free surfaces of said liquid levels in each said wave guide; means for exciting said transmitting means and measuring time intervals between various pulses, said time intervals being proportional to corresponding distances from said transmitting means; output means for calculating, displaying and tabulating levels and volumes of said liquids and providing control signals to actuate a drain pump to remove water when its level exceeds a preset value in said other waveguide.

2. A system as described in claim 1 wherein said wave guide tubes are approximately as long as the vertical extent of said tank, typically a few meters, and have diameters on the order of a few centimeters.

3. A system as described in claim 1 wherein said waveguides are made of sturdy metal or of plastic compatible with liquids in said tank.

4. A system as described in claim 1 wherein said reflecting stub or ring is located in each wave guide at a distance from the top, approximately equal to 30 cm, said distance being sufficient to separate a pulse reflected from said stub or ring from an initial ringing signal from said transmitted pulse.

5. A system as described in claim 1 wherein widths of said pulses are typically of 0.2 ms duration.

6. A system as described in claim 1 wherein said stubs or rings are replaced by a pair of microphones separated by said reference length, in each waveguide to provide a non-obstructing design wherein said signals are free of said initial transmitted ringing pulse and therefore allows one of said microphones to be placed as close as 3 cm to said transmitter.

7. A system as described in claim 6 has a minimum reference length equal to 15 cm which is much shorter than the minimum distance possible if signals are derived from the same transmitter-receiver instead of being derived from said microphones.

8. A system as described in claim 6 where said signals from said pair of microphones are added to produce a composite signal for processing, said composite signal being such as to preserve all time delays accurately.

9. A system as described in claim 1 where multiply reflected signals are used to eliminate the small time delay between said electrical excitation to said transmitter and said generated initial pulse.

10. A system as described in claim 1 where time intervals between pulses are measured to an accuracy of 1 part in 200, yielding a corresponding accuracy of 1 part in 200 in the measured gasoline level in said tank.

11. A system as described in claim 1 where the time intervals between pulses are measured to an accuracy of 1 part in 200 which yields a corresponding accuracy of the water level of 1 part in 200 when said tank is nearly empty of gasoline but leads to progressively poorer accuracies with the presence of more gasoline above water, assuming that the densities and temperatures of both said liquids are not measured.

* * * * *